United States Patent [19]

Scholefield et al.

[11] Patent Number: 5,752,193
[45] Date of Patent: May 12, 1998

[54] METHOD AND APPARATUS FOR COMMUNICATING IN A WIRELESS COMMUNICATION SYSTEM

[75] Inventors: Christopher Scholefield, Delta; Ronald H. Gerhards, Vancouver, both of Canada

[73] Assignee: Motorola, Inc., Schaumburg, Ill.

[21] Appl. No.: 522,742

[22] Filed: Sep. 1, 1995

[51] Int. Cl.$^6$ ............................................. H04Q 7/20
[52] U.S. Cl. ...................... 455/452; 455/512; 455/527
[58] Field of Search .............................. 455/34.1, 34.2, 455/54.1, 54.2, 58.1, 58.2, 62, 422, 434, 450–452, 455, 9, 509–510, 512, 515–516, 517, 527, 67.1; 370/468, 444, 465, 437, 448, 447

[56] References Cited

U.S. PATENT DOCUMENTS

| | | | |
|---|---|---|---|
| 4,012,597 | 3/1977 | Lynk, Jr. et al. | 455/54.2 |
| 4,788,543 | 11/1988 | Rubin | 455/58.1 |
| 5,319,641 | 6/1994 | Fridvich et al. | 370/447 |
| 5,353,287 | 10/1994 | Kuddes et al. | 370/448 |
| 5,440,759 | 8/1995 | Barnes et al. | 455/54.1 |

*Primary Examiner*—Nguyen Vo
*Attorney, Agent, or Firm*—J. Ray Wood

[57] ABSTRACT

The disclosed system is capable of allocating plural subchannels based on user data priority. In one embodiment, after receiving a system parameters such as a current priority level from a base station, a subscriber determines whether to send an access request for plural subchannels. Upon receipt of the access request(s), the system determines from the access request(s) whether to allocate the subchannel(s) to the subscriber. Further access requests are received periodically and scheduled, and when a higher priority message is received, completion of a lower priority message is deferred and the higher priority request allocated. Thus, an improved access procedure is provided accommodating multiple priority requests in an efficient manner. In a further embodiment, the system parameters include persistence/probability values for each service priority level, and each transmitting unit applies the appropriate value for the data priority to be sent in determining when to send an access request.

15 Claims, 6 Drawing Sheets

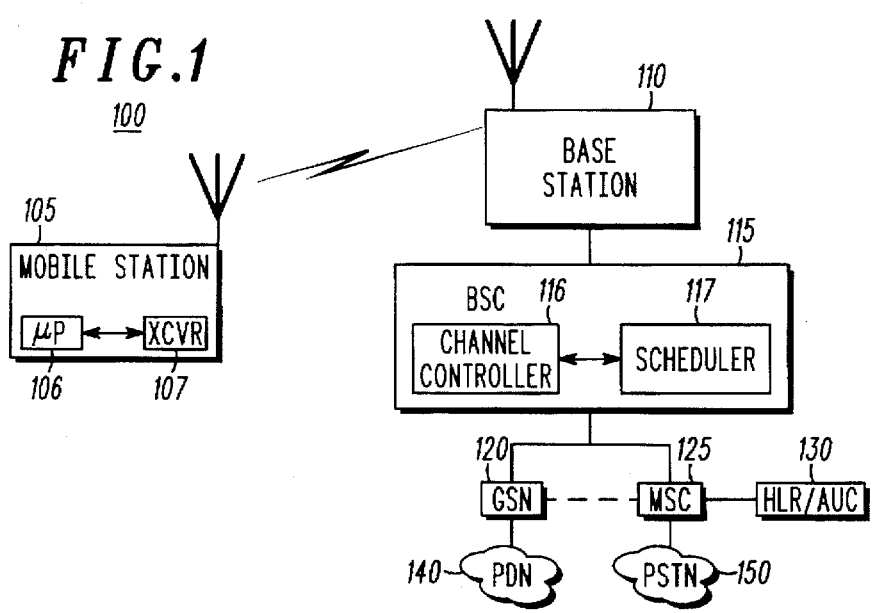
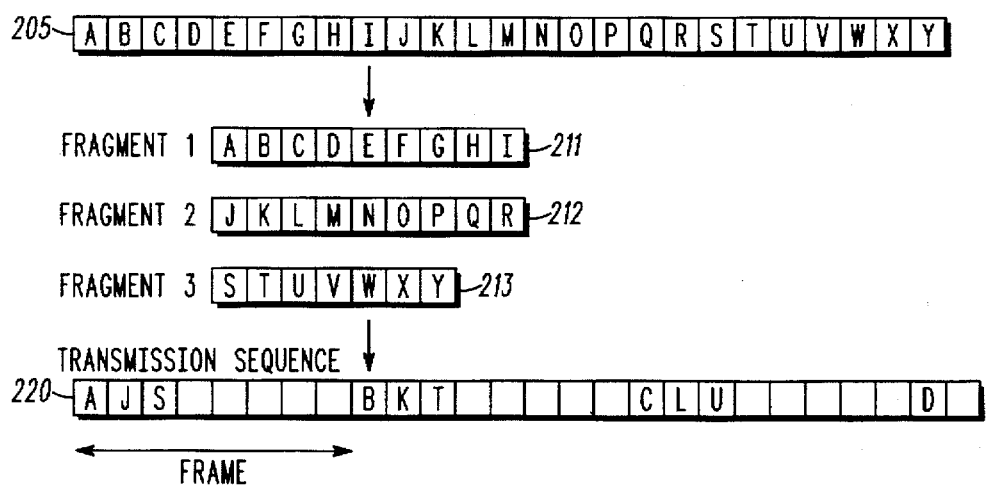
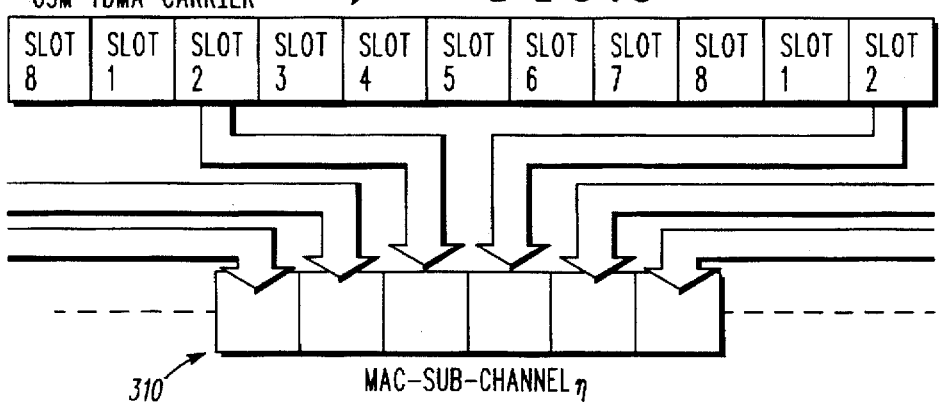

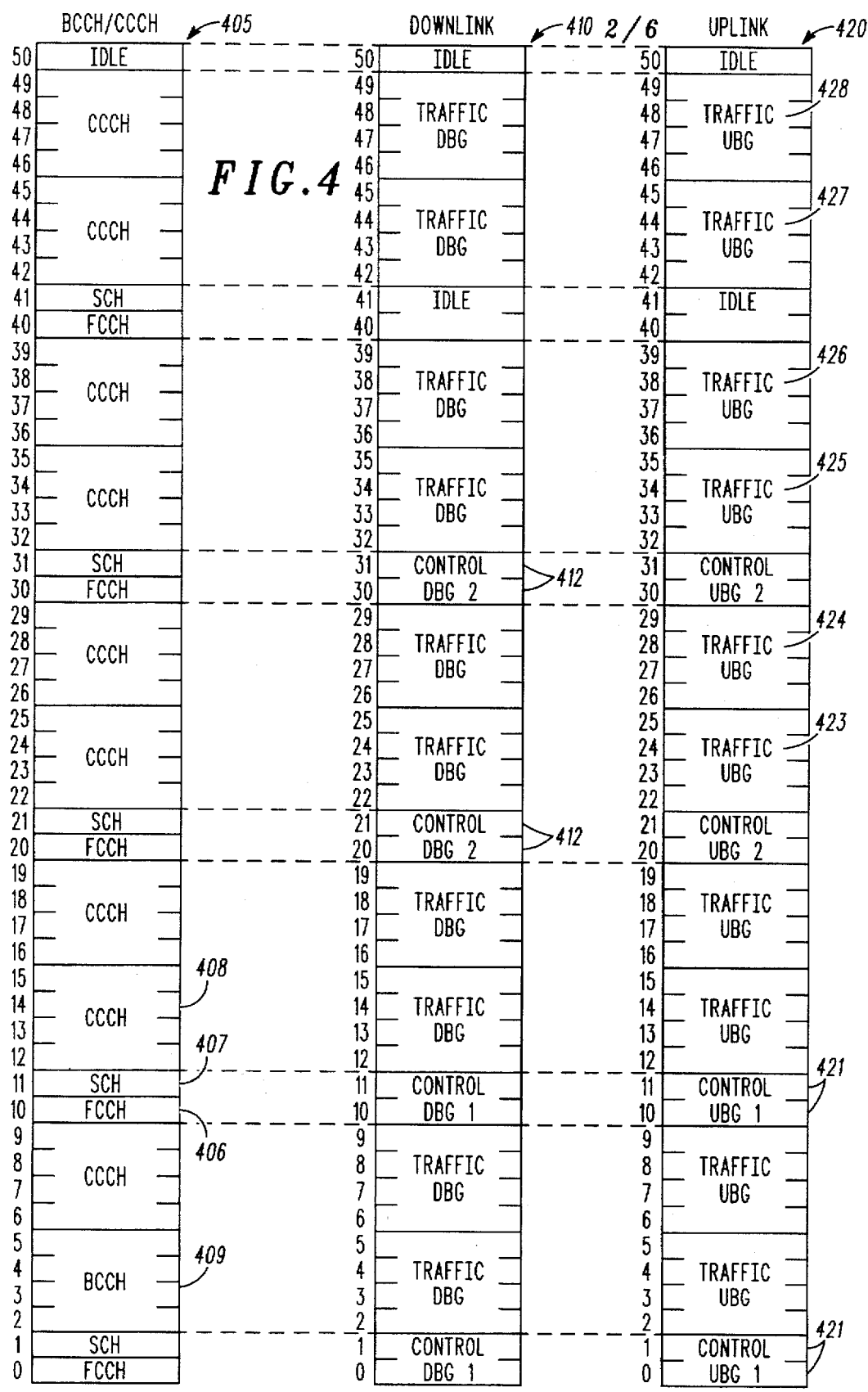

FIG.8
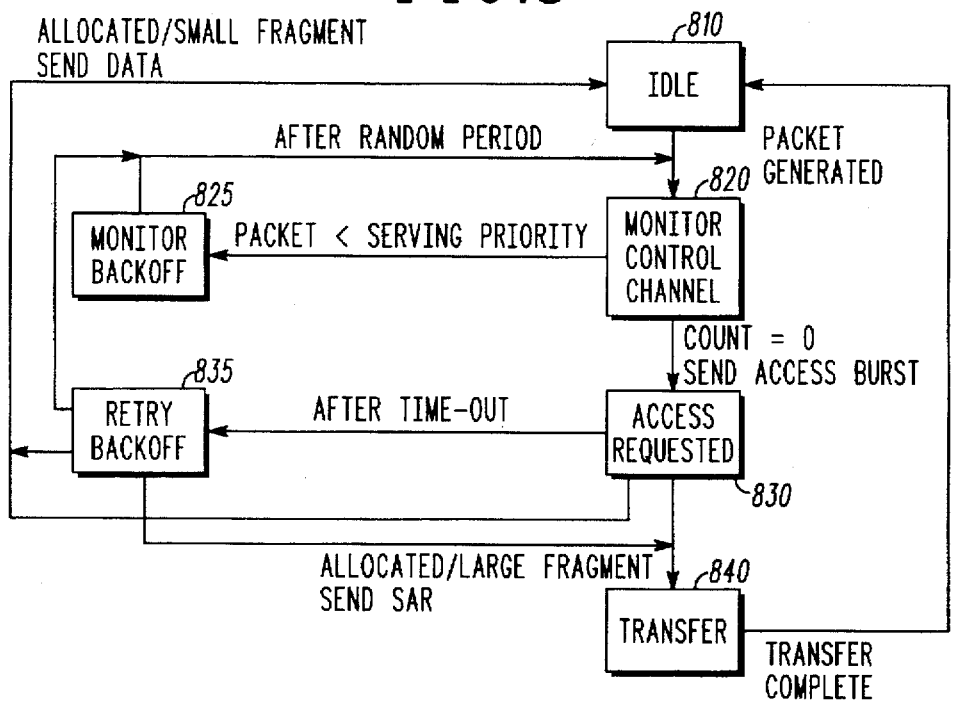
FIG.9
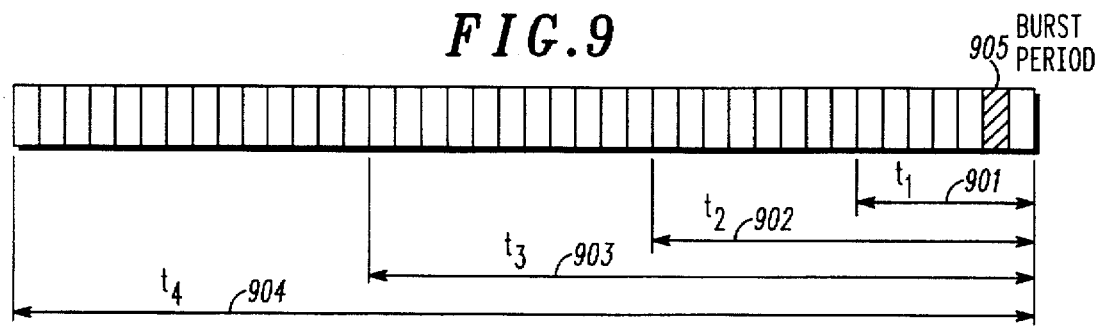
$t_1$: PRIORITY 1 ACCESS REQUEST PERIOD
$t_2$: PRIORITY 2 ACCESS REQUEST PERIOD
$t_3$: PRIORITY 3 ACCESS REQUEST PERIOD
$t_4$: PRIORITY 4 ACCESS REQUEST PERIOD
FIG.10
P-PERSISTENCE PARAMETERS
| PRIORITY (n) | $P_n$ | $W_n = 1/P_n$ |
|---|---|---|
| 1 | .05 | 20 |
| 2 | .03 | 33 |
| 3 | .025 | 40 |
| 4 | .02 | 50 |

METHOD AND APPARATUS FOR COMMUNICATING IN A WIRELESS COMMUNICATION SYSTEM

FIELD OF THE INVENTION

The present invention relates to communications and more particularly an improved method and apparatus for communicating data in a wireless communications system.

BACKGROUND

The last 10 years has seen a tremendous increase in the demand for wireless networks capable of handling data communications. Unlike voice services, such as the GSM (Global System for Mobiles) cellular service, in which circuit-switched communications are used because of the sensitivity of users to the timing of oral dialogue, greater efficiencies can be achieved in data communications through the use of packet-switched and hybrid communications. Thus, it is anticipated that a significantly increased throughput can be achieved for shorter traffic by using proposed services such as the GPRS (GSM Packet Radio Service) over traditional circuit-switched wireless technology.

However, with the increased demand for wireless services has also come a demand for higher throughput rates of data traffic, at least for some users. One proposed solution to this need is the use of "quality of service" (QOS) grades for data traffic. By designating a particular data message with a high QOS grade or priority, users who have the need for rapid end-to-end delivery of their data will have their data delivered ahead of lower QOS data. On the other hand, users who do not want to pay the higher QOS rates and can tolerate longer end-to-end delays can designate their data traffic with a lower QOS grade.

Two key problems in implementing this type of service for wireless data communications are delays in obtaining access to a wireless channel, and limited throughput due to the limited bandwidth of wireless channels. The first problem arises because there are only a limited number of channels (or in the case of TDMA (time division multiple access) systems like GSM, subchannels/time slot sets) available for any given base station service area. Any delay in access will mean a decrease in the time the subchannels are available for actual data transmissions. Further, as the system approaches peak loading, there may well be many more mobile stations (MSs, or more generally subscriber units) attempting to gain access than can be accommodated by the system.

In order to reduce this access delay a number of medium access control (MAC) protocols have been proposed for wireless systems, including ALOHA, Slotted-ALOHA, reservation ALOHA, CSMA (Carrier-Sense Multiple Access), DSMA (Digital-Sense Multiple Access), PRMA (Packet Reservation Multiple Access) and QCRA (Queued Contiguous Reservation Aloha). However, all of these protocols have a limitation in that all of them allocate single channels to a mobile station for a continuous period of time (or in TDMA systems, a continuous subchannel, i.e., a series of time slots) until the data transfer is complete. Thus, any new user, even one having a higher priority, has to wait until the end of the current users message. Further, no provision is made for deferring a lower priority message, either one waiting to be sent or only partially sent, since those subscribers not receiving an allocation need to contend again for access to the channel when it next becomes available.

The second problem, limited throughput, is particularly noticeable in TDMA systems. For example, in current GSM systems the maximum throughput for packet data is 9.6 kbps with error correction, or higher without, because only about 33 kbps raw transmission rate is possible for a burst given the standardized bit rate of 270.833 kbps and 0.577 ms (millisecond) for each of the eight time-slot periods. To improve this throughput, one proposal has been to allow for the use of multiple subchannels (e.g., 2 or more time slots per frame), thus effectively doubling or more the throughput rate. A drawback to this approach is that environmental factors such as fading often last longer than a single time slot, although most fades in moving subscribers will be over within a frame period. Under the prior approach, a given fade only stands to corrupt a single time slot period of data, while under the proposed approach a fade may corrupt 2 or more time-slot periods of data in a row. This in turn increases the likelihood that any error correction coding will be unable to successfully recover the received packet, thus leading to an increase in ARQs (automatic repeat requests) and overall decrease in the throughput rate.

There remains therefore a need for an improved means for data communications in wireless systems that solves these and related problems.

BRIEF DESCRIPTION OF THE DRAWINGS

FIG. 1 is a block diagram of a wireless communications system according to first and second embodiments of the invention;

FIG. 2 is a diagram illustrating a MAC layer packet fragmentation and interleaving according to the first embodiment of the invention;

FIG. 3 is a diagram illustrating a MAC layer subchannel structure;

FIG. 4 is a diagram illustrating a multiframe structure according to a second embodiment of the invention;

FIG. 8 is a state diagram illustrating transition states for access of the subscriber unit in the wireless communications system of FIG. 1;

FIG. 9 is a diagram illustrating an uplink multiframe structure according to the second embodiment of the invention; and FIG. 10 is a table illustrating access control parameters for use with the second embodiment of the invention.

DETAILED DESCRIPTION

Figure 5:
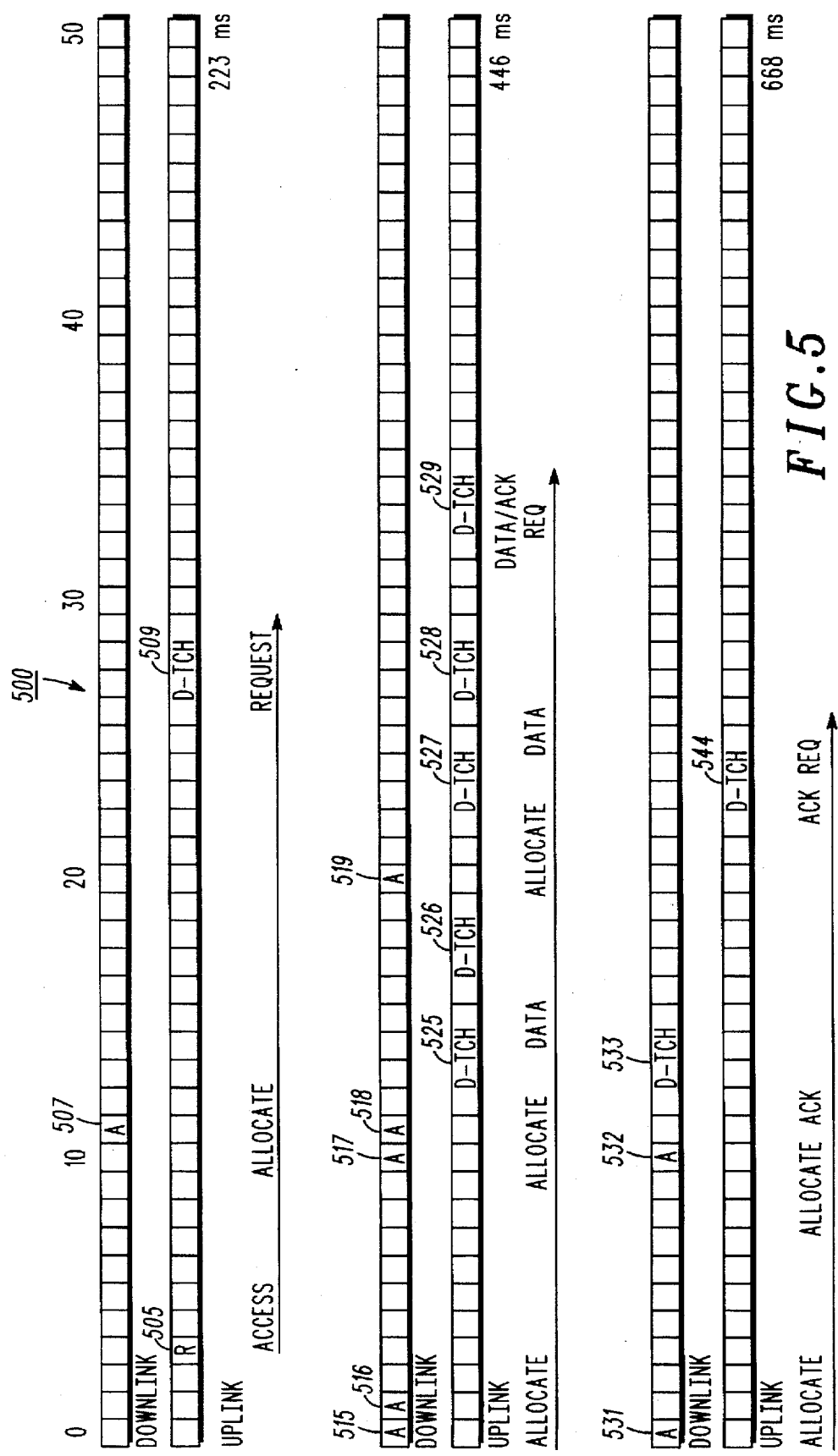
FIG. 5 is a diagram illustrating subchannel access and allocation according to the second embodiment of the invention.

These problems and others are solved by the improved method and apparatus according to the invention. A presently preferred embodiment of the invention is a system for allocating one or more subchannels based on priority of user data. After receiving a control message including a current priority service level message from a base station, a subscriber unit determines whether or not to send an access request for one or more subchannels. Upon receipt of an allocation/access request, the system infrastructure determines from the access request whether to allocate the subchannel(s) to the subscriber unit. Periodically further access requests are received and scheduled and, when a higher priority message is received, completion of a lower priority message is deferred and the higher priority request allowed to proceed. Thus, an improved, access procedure is provided that allows for quicker access times as the priority of the data traffic increases. In a further embodiment, plural subchannels are requested and, when allocated, a data packet is fragmented into plural data units and each data unit sent via a different subchannel. Because the effect of the fragmenting and transmission on different subchannels is similar to that of interleaving the original data packet, a more robust and higher throughput can be achieved with the present invention.

Turning now to FIG. 1, there is generally depicted a wireless communications system 100 having one or more subscriber units (i.e., mobile station (MS) 105) communicating via a base station (BS) 110 and base station controller (BSC) 115. The subscriber unit may be of such diverse types as dedicated data units (e.g., personal digital assistants (PDAs)), radiotelephones adapted for coupling with data terminals (e.g., portable computers), or wireless adapter devices (e.g., wireless modems adapted for coupling with computers, message pads, etc.), and the like. In any event, the subscriber unit includes a transceiver 107 and processor 106 appropriately programmed for wireless data communications according to a serving systems protocols. In the illustrated case a combined GPRS-GSM system is shown, although it will be recognized that the embodiments discussed herein are equally applicable to any other wireless communications system, including CDPD (cellular digital packet data), CDMA (code division multiple access), and data systems like ARDIS or RAM. Thus, the portion of the GSM system servicing voice subscribers includes an MSC (mobile switching center) 125 connected to an HLR/AuC (home location register/authentication center) 130 and PSTN (public switched telephone network) 150. The GPRS portion includes a GSN (GPRS service node) 120 connected to a packet switched PDN (public data network). GSN 120 includes all information necessary for appropriate routing of data messages; it may alternatively be coupled to MSC 125 to allow access to higher layer user information stored at a common platform such as HLR 130. BSC 115 includes a channel controller 116 and scheduler 117, along with typical BSC circuitry.

The operation of this system can be further understood by additional reference now to FIGS. 2 and 3. FIG. 2 illustrates a fragmentation/multiplexing process according to an embodiment of the present invention. A user packet 205 can be logically considered a series of MAC layer PDUs (packet data units). In the case of GPRS, the length of each PDU is determined by the amount of data capable of transmission in a single burst/time slot period. Thus, in a prior art approach a first PDU "A" would be sent in a first time slot of a first frame (each frame having 8 time slots), the second PDU "B" would be sent in the first time slot of the second frame, and so on until all PDUs are sent. Since this approach has limited bandwidth, another approach proposed is that of assigning plural time slots and sequentially transmitting the PDUs. Thus, for example, if time slots 1 and 2 were assigned, PDU "A" would be sent in time slot 1 of frame 1, PDU "B" in time slot 2 of frame 1, PDU "C" in time slot 1 of frame 2, and so on. The present embodiment improves on these approaches by further segmenting the packet 205 into plural SDUs (service data units, e.g., 211, 212 and 213), each SDU for transmission in a designated subchannel (as further shown by FIG. 3, where the PDUs being sent in time slot 2 of channel 305 make up a MAC layer subchannel SDU 310).

Thus, the actual transmission sequence 220 in the illustrated case is SDU 211 in time slot 1, SDU 212 in time slot 2, and SDU 213 in time slot 3. In doing so, the PDUs are effectively interleaved, thus providing for greater immunity to fading while permitting increased throughput via multiple subchannels. Upon reception, the plural PDUs is defragmented and error corrected into a replica of the original data packet.

In a preferred approach to fragmenting the data packet, the requesting communication unit begins by determining the desired throughput rate (i.e., how many subchannels it wants to request) and fragments the packet 205 accordingly. This allows the subscriber to include, overhead permitting, the size of each SDU in the access request.

For simplified operations, an access request is sent on each desired subchannel. For example, where the base station broadcast information indicates that time slots 1-3 of a communications resource/channel are available for GPRS service, a subscriber wanting high throughput would fragment its data packet into 3 SDUs and send an access request on all three time slots. When received by the infrastructure, e.g., at scheduler 117 of BSC 115, a determination is made on whether to grant access to each subchannel. Where the data packet has higher priority than any other pending access requests, a scheduling message is sent to the channel controller 116 allocating all three subchannels and the subscriber is notified by allocation messages on the respective subchannels.

On the other hand, where the data packet only has the highest priority on subchannels 1 and 2, an allocation of only these subchannels would be made. The remaining subchannel would be allocated to a higher priority message, and an allocation for the SDU for slot 3 deferred; alternatively the access request could be denied, allowing the subscriber to attempt a further allocation on subchannels 1-2, or possibly a different channel, rather than wait a longer amount of time for the priority queue on subchannel 3 to be serviced.

In yet another approach, a single access request is sent requesting plural subchannels. In response scheduler 117 would either send back one allocation message, or, as in the first approach, separate allocation messages on each subchannel, with the subscriber scanning each possible subchannel (e.g., all GPRS available ones) to listen for its allocation(s). Upon receiving the allocation(s) of a number n designated subchannels, the subscriber then fragments the data packet into n data units and communicates each data unit via a respective one of the n designated subchannels. Because each subchannel may be deferred due to higher priority data, each subchannel transmission is preferably asynchronous with respect to the others.

Figure 6:
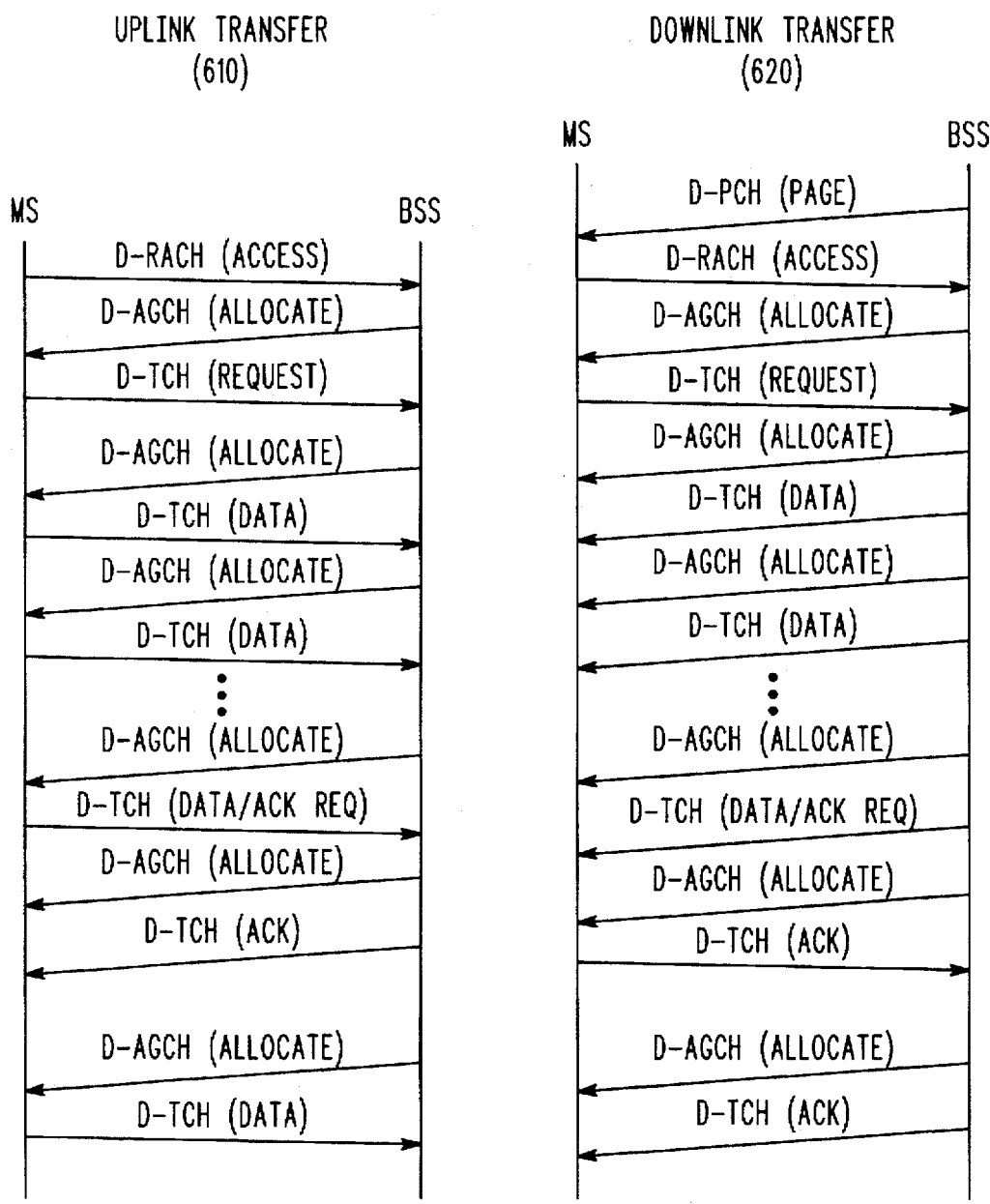
FIG. 6 is a diagram illustrating messaging for access and data transfer according to the second embodiment of the invention.

In another preferred embodiment of the invention each subchannel allocation is only made for a designated period of time, thus permitting reallocation of a subchannel to a higher priority data message. Referring to FIGS. 4-6, a multiframe channel structure is shown which may be used in implementing this feature. A GSM control channel multiframe 405 has 51 frames including BCCH (broadcast control channel) frames 409 and CCCH (common control channel) frames 408, FCCH (frequency control channel) frames 406 and SCH (synchronization channel) frames 407. A GPRS multiframe does not need to repeat the SCH and FCCH frames, so in the preferred embodiment of the invention these are replaced by control UBGs (uplink burst groups) for the uplink channel 410, control DBGs (downlink burst groups) for the downlink channel 420, and traffic burst groups. In the preferred approach for GPRS a MAC layer codeword (e.g., an error correction encoded packet data unit (PDU) of the original data packet) is additionally defined as a four frame burst group (i.e., it occupies 4 time slots, in which case the MAC layer PDU is typically the same as the burst group). Thus, time-synchronized and time division multiplexed uplink and downlink communications channels having repeating control and traffic communications periods are provided.

In this case, a typical messaging sequence 610 for an uplink data transfer would proceed as follows. Based on broadcast priority service parameters, the subscriber determines when to begin by sending a random access burst 505. Because a typical random access burst is limited in size, at best a limited priority indicator between two levels of service is possible during this initial access period (e.g., either distinguishing between highest priority data and all others, or between all priority data and "best efforts" data, depending on system design). Further information, such as a full priority indicator (i.e., indicating the specific grade of service requested) is thus typically needed in a supplementary access period. In this case, an allocation 507 of a single traffic UBG 509 is then made on a priority basis (unless the request is for non-priority data when only priority data is being serviced). This supplementary access request preferably includes information about the size of the SDU to be transferred, in addition to the priority indicator and other desirable information (such as identifiers, authentication information, a parameter including multiple subchannel transmission capability, etc.). Scheduler 117 receives the access request and, based upon channel/activity factors such as the priority level, number of other pending requests of similar or higher priority, size of the SDU(s), authentication results, a determination is made whether to allocate traffic subchannel(s). Upon determination that the request has the highest priority, for example by comparing priority levels or FIFO (first in first out) within the same grade, an allocation is sent via the control DBGs, e.g. during frames 515-519, each such frame corresponding to a traffic burst group 525-529, respectively. Upon monitoring for and receiving the allocation(s), the subscriber communicates the PDU via the designated burst groups. Similar allocation/ communication is done for downlink data transfers 620 (the main difference being initiation via a downlink paging signal), and on other subchannels in the event plural subchannels are requested and allocated. Finally, upon receipt of the acknowledgment request and error correction, as needed, further allocations 531, 532 are made for transmission of an ACK (acknowledgment) during traffic DBG 533 and response during traffic UBG 544.

In the case where traffic UBGs were being allocated to a first data traffic having, say, priority 3, but the base station is monitoring for and receives an access request for second data traffic having a higher priority 2, this multiframe control structure advantageously allows scheduler 117 to defer completion of the first user's data transfer (i.e., only send a first portion) until after the second user's data is sent. If the second user's data only consists of three codewords, scheduler 117 can allocate the next three traffic UBGs to the second user, and reallocate the subsequent traffic UBGs to the first user to finish sending a further portion of its data packet. One skilled in the art will recognize that this multiframe structure can be readily altered based upon the design factors for any given system. What is significant for this particular embodiment is that allocations are made only for a limited portion of the resource (e.g., a limited period of time such as a maximum number of burst groups), following which another allocation is made—either for the same data, or a new, higher priority data packet.

Figure 7:
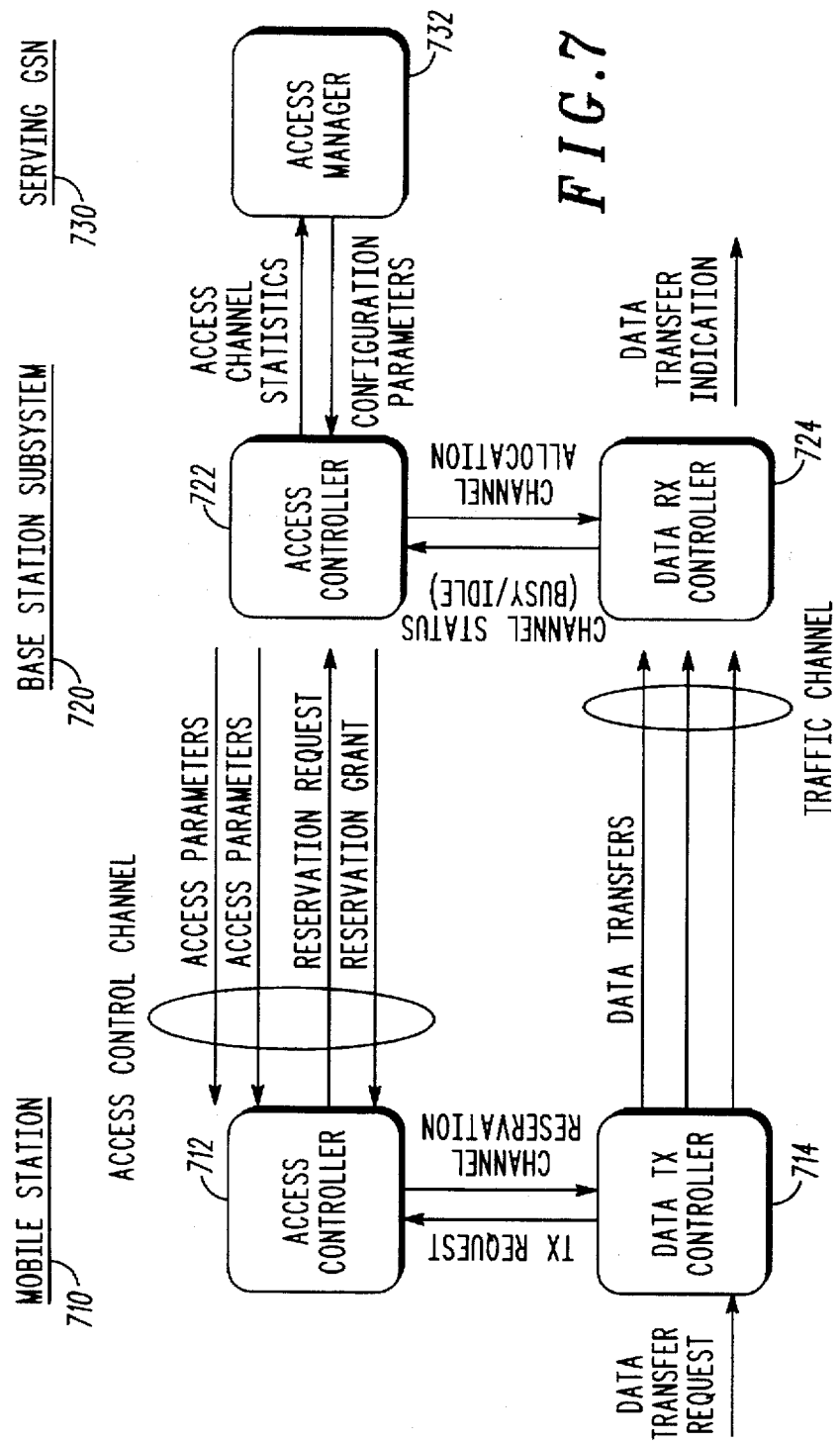
FIG. 7 is a further diagram illustrating messaging between different functional entities of the wireless communications system of FIG. 1.

Turning to FIG. 7 and 8, the access control and data transfer functions of the preferred embodiment are further illustrated. In FIG. 7, the control/traffic communications flow among the MS 710, BS subsystem 720 and GSN 730 is generally depicted. Both MS 710 and BS/BSC 720 include access controllers (712 and 722 respectively) and data transmission controllers (714 and 724 respectively), which GSN 730 includes an access manager 732. Current configuration parameters, including loading and service priority information derived from usage and access channel statistics, is communicated between the GSN 730 and BS/BSC access controller 722. Based on this information access control parameters are determined and broadcast via the BS to MSs in the BS service area. These access parameters are preferably the current service priority level and access probability parameters. When the MS data transmission controller 714 receives a data transfer request, a transmission request message is transferred to the access controller 712 (i.e., moving from state 810 to monitor state 820 of FIG. 8). Based on the access control parameters and its data message priority, MS access controller 712 determines whether to send an access request (state 830) or backoff (state 825), and BS/BSC access controller 722 determines whether to allocate communications resource(s) in response to such a request. After a time-out period and no response, MS 710 again retries access (state 835). Upon allocation, access controller 722 notifies both MS 710 and data receiver controller 724 of the subchannel allocation, and the data transmitter controller 714 and data receiver controller 724 commence transfer of the data (state 840).

In order to facilitate transfer of higher priority data, preferably two procedures are employed to limit MS access requests. The first is the broadcasting of a current service priority message. This message communicates a minimum QOS grade/priority for incoming traffic, so as to prevent more than peak loading of the access and/or traffic channels. Each MS having data to transfer determines in its processor the priority level of the data message, and inhibits any access request if the priority level is less than the current priority service level. If a subscriber wants to send traffic and a comparison of the priority service level for other subchannels shows that no subchannel is available at the specified grade of service, the subscriber may optionally chose to either automatically or via user input alter the data priority (and billing) level to a level high enough to permit access requests. Additionally, if other packets of higher priority are queued in the MS, the MS may chose to transmit the higher priority data packets ahead of a currently queued lower priority packet.

The second procedure is illustrated in FIGS. 9 and 10. Each MS having a qualifying priority level next determines whether to transmit during a current access period (e.g., an idle UBG traffic or control period) based on the received access control parameters. Preferably these parameters include a vector of access probability values $\{p_n, p_2, \ldots p_n\}$, each p value representing a p-persistence value corresponding to grade of service/priority levels 1 through n. The table of FIG. 10 illustrates one possible set of p-persistence values $P_n$. In this case, data having a priority level 1 has a p vector value of 0.05. Various means for broadcasting and applying the $P_n$ values may be used, with one such being as follows. In order to facilitate transmission of the $p_n$ values the closest integer $1/p_n$ ($=w_n$, or an access window period) is transmitted for each value in the vector. Upon selecting the value $w_n$ corresponding to the priority level of the data, an MS generates a random number between 1 and $w_n$ for an access delay value, and counts this value/number of allowed burst periods (i.e., data time slots available for access bursts) before transmitting its access/reservation request; counting is suspended during periods when the MS is not allowed access. Thus, as illustrated in FIG. 9, a priority level 1 packet will have a maximum wait period $t_1$ (901) substantially shorter than periods $t_2$ through $t_4$ (902–904) for priority levels 2 through 4. However, the actual burst period 905 at which an access request is sent could be the same for data traffic of all priority levels (at least those greater than the minimum priority level), although with differing probabilities of occurrence.

One useful algorithm for implementing the above for GPRS is a proposed pseudo-Bayesian algorithm modified to consider a three state feedback: idle, success or collision. In this case the number n of current users is approximated using a Poisson distribution of backlogged users having mean of n. This approximation, v, is used to calculate the transmission probability $p=\beta/v$, where $\beta$ is the value at which maximum channel throughput occurs, which for purposes of discussion, for slotted-ALOHA (S-ALOHA) in GPRS, can be assumed to be about 1.39. An estimate $\lambda$ is also made of the arrival rate of new requests, which for GPRS A-ALOHA may similarly be estimated at about 0.39 maximum. Each subscriber keeps a local copy of the value v (or $w_n$) and updates based upon available channel station information: for collisions, v=v+1.39; for success, v=max (1.39, v−0.61); and for idle, v=max (1.39, v−1). Following calculation, the base station broadcasts the value p to be similarly applied as above by each MS.

While the invention has been described in conjunction with specific embodiments thereof, it is evident that many alterations, modifications, and variations will be apparent to those skilled in the art in light of the foregoing description. For example, while processor 106, channel controller 116 and scheduler 117, and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors). Further, the invention is not limited to the illustrated cellular systems, but has applicability to any wireless data system. Thus, it should be understood that the invention is not limited by the foregoing description of preferred embodiments, but embraces all such alterations, modifications, and variations in accordance with the spirit and scope of the appended claims.

We claim:

1. A method of communicating data via a wireless communications system, comprising:

receiving a first access request including a priority indicator from a first communication unit during at least a first access period;

determining the priority of the first access request relative to any other pending access requests previously received;

allocating a communications resource during a first traffic period to the first communication unit for communication of a first portion of a data message when the first communication unit has a highest priority;

monitoring in a second access period for a further access request by a further communication unit having a higher priority indicator, and when said further access request is received, allocating the communications resource during a second traffic period to the further communication unit; and determining in a still further access period that the first communication unit again has the highest priority, and in response thereto allocating the communications resource during a still further traffic period to the first communication unit for communication of a further portion of the data message.

2. The method of claim 1, wherein the first portion is a first codeword and the first traffic period is a first traffic burst group.

3. The method of claim 1, further comprising: determining a current service priority for the communications resource, the communications resource being a first subchannel broadcasting an access control parameter corresponding to the current service priority.

4. The method of claim 3, wherein the current service priority is determined based on a measure of channel activity.

5. The method of claim 4, wherein the measure of channel activity is determined based on activity factors including at least one of: a priority level of a set of pending access requests having a highest priority; a number of all pending access requests; a size of each service data unit corresponding to all pending access requests.

6. A wireless communications system for communicating data, including at least one base station coupled to a base station controller, the at least one base station being arranged for receiving a first access request including a priority indicator from a first communication unit during at least a first access period;

the base station controller having a channel controller being arranged for determining the priority of the first access request relative to any other pending access requests previously received and for allocating a communications resource during a first traffic period to the first communication unit for communication of a first portion of a data message when the first communication unit has a highest priority;

the at least one base station being further arranged for monitoring in a second access period for a further access request by a further communication unit having a higher priority indicator, and when said further access request is received, allocating the communications resource during a second traffic period to the further communication unit; and the channel controller being further arranged for determining in a still further access period that the first communication unit again has the highest priority, and in response thereto, allocating the communications resource during a still further traffic period to the first communication unit for communication of a further portion of the data message.

7. The wireless communications system of claim 6 wherein the channel controller is operable for determining a current service priority for communications resource, sending via the base station an access control parameter, and allocating the communications resource in response to received access requests; and the base station controller further comprising a scheduler coupled to the channel controller operable for determining which one of the access requests has a highest priority and sending a scheduling message to the channel controller identifying said one of the access requests.

8. The system of claim 7, wherein the base station is further coupled to a service node for receiving loading information about the communications resource, and the channel controller is further operable to determine the current service priority based on the loading information.

9. The wireless communications system of claim 6 further comprising:
- a transceiver for receiving an access control parameter from a base station of the system; and
- processor means for determining whether to send an access request based on the access control parameter and a priority level of a pending data message.

10. A subscriber unit for communicating data in a wireless communications system comprising:
- a transceiver for receiving an access control parameter from a base station of the system; and
- processor means for determining whether to send an access request based on the access control parameter and a priority level of a pending data message, wherein the processor means is further operable to inhibit sending the access request when the priority level is less than a current service priority corresponding to the access control parameter, and otherwise to determine whether to send the access request based on an access probability based on the access control parameter and the priority level of the pending data message.

11. A method of communicating data via a wireless communications system, comprising:
- receiving a control message indicating a current priority service level of communication messages being granted access on a first subchannel;
- comparing the current priority service level with a priority level of a first data message,
- transmitting an access request including a priority indicator for the first data message when the priority level of the first data message is at least as great as the current priority service level; and
- monitoring for an allocation of the first subchannel, wherein the step of receiving further comprises receiving at least one control message indicating the current priority service level of communication messages being granted access on a first subchannel and further current priority service levels for further subchannels; and further comprising:
  - when the current priority service level for the first subchannel is greater than the priority level of the first data message, comparing the further current priority service levels with the priority level to determine if one of the further subchannels is available.

12. The method of claim 11, further comprising, when all the further current priority service levels for the further subchannels are greater than the priority level of the first data message, determining whether to increase the priority level of the first data message.

13. A method of communicating data via a wireless communications system at a communication unit, comprising:
- receiving a control message indicating a current priority service level of communication messages being granted access on a first subchannel;
- determining an access probability value based on a priority level of a first of at least one data message;
- comparing the current priority service level with the priority level of the first of the at least one data message;
- determining whether to transmit the access request based on the access probability value;
- transmitting an access request including a priority indicator for the first of the at least one data message when the priority level of the first of the at least one data message is at least as great as the current priority service level; and
- monitoring for an allocation of the first subchannel, wherein the step of determining an access probability value comprises receiving access control parameters indicative of a set of persistence values corresponding to a set of possible priority levels, determining which one of the set of persistence values corresponds to the priority level of the first data message, and determining the access probability value by generating a random number between one and the inverse of said one of the set of persistence values.

14. A method of communicating data via a wireless communications system, comprising:
- receiving a control message including access control parameters indicative of a set of persistence values corresponding to a set of possible priority levels used for determining when to send an access request for a first subchannel of a communications resource;
- determining which one of the set of persistence values corresponds to a priority level of a first data message;
- determining an access delay value based on said one of the set of persistence values; and
- transmitting the access request based on the access delay value.

15. The method of claim 14, further comprising comparing the priority level of the first data message with priority levels of subsequently stored messages, and when one of the subsequently stored messages has a second priority level greater than the priority level of the first data message, determining whether to transmit an access request for said one of the subsequently stored messages based on a further one of the set of persistence values corresponding to the second priority level.

* * * * *